United States Patent [19]

Tezuka

[11] 4,428,657

[45] Jan. 31, 1984

[54] MOTORIZED DRIVING DEVICE FOR CAMERA

[75] Inventor: Nobuo Tezuka, Tokyo, Japan

[73] Assignee: Canon Kabushiki Kaisha, Tokyo, Japan

[21] Appl. No.: 398,823

[22] Filed: Jul. 16, 1982

[30] Foreign Application Priority Data

Jul. 27, 1981 [JP] Japan ................................ 56-117271

[51] Int. Cl.³ .............................................. G03B 1/00
[52] U.S. Cl. ................................................ 354/173.1
[58] Field of Search ......................................... 354/173

[56] References Cited

U.S. PATENT DOCUMENTS 4,273,432 6/1981 Matsuda et al. .................... 354/173

Primary Examiner—Michael L. Gellner
Attorney, Agent, or Firm—Toren, McGeady and Stanger

[57] ABSTRACT

A motorized driving device for a camera is arranged to operate selectively in the film winding and rewinding modes. A switching mechanism allows the electric motor to rotate in only one direction. When the camera is switched from the rewinding to the winding mode, the switching mechanism is maintained in a motor current supply position for a certain prolonged period, so as to ensure that a reversed drive torque is transmitted by the device.

5 Claims, 4 Drawing Figures

MOTORIZED DRIVING DEVICE FOR CAMERA

BACKGROUND OF THE INVENTION

1. Field of the Invention

This invention relates to a motorized driving device for a camera, in which winding-up and rewinding of film is performed by an electric motor.

2. Description of the Prior Art

It is known to provide a motorized driving device for cameras, in which the various mechanisms of the camera including at least the film feeding mechanism are charged by an electric motor and, when the exposed film is to be rewound, the mechanism for transmitting driving torque from the motor is first changed over to a rewinding position. The motor control switch that was used when winding up is then moved again to the current supply position, as proposed, for example, in U.S. Pat. No. 4,273,432 (issued June 16, 1981). However, such conventional motorized driving device is arranged so that the motor control switch is returned to a position for operative connection with the film winding-up mechanism when changing over the transmission mechanism from the rewinding to the winding-up mode. In case the winding-up mechanism is in the charged position when such changing over operation is carried out, the current supply to the motor is stopped in response to the changing over operation. In the alternate case, where the winding-up mechanism is not yet charged, the termination of current supply to the motor is deferred until completion of charging.

That is, in such conventional motorized driving device, as the transmission mechanism is changed over from the rewinding mode to the winding mode, the current supplying state to the motor changes depending upon the position of the winding-up mechanism at the time when such changing over operation is performed. Also with the winding-up mechanism in the charged position, when the changing over operation from the rewinding mode to the winding mode is performed, it results that the motor stops at that time point.

Further, in the art of motorized driving devices for cameras, it is known to construct the transmission mechanism by using gears. But, such transmission mechanism has a problem that when changing the direction of transmission of the driving torque, it is required that after the changing over operation has been performed, the drive gear be somewhat rotated so that the phases of the teeth of the driven gear are synchronized with each other. Otherwise transmission in the reversed direction will not be established. For this reason, in such transmission mechanism, if the performance of the changeover operation from the rewinding mode to the winding mode results in suddenly stopping the motor, the transmission mechanism remains in the rewinding position.

Therefore, in the prior art motorized driving device, after the rewinding of the film had been stopped by changing over from the rewinding mode to the winding mode, when a new film was loaded into the camera and a normal winding operation was intended to take place, there was a high possibility of a full retraction of the film leader into the cartridge, as the driving torque of the motor was transmitted to the rewinding mechanism. In other words, since such prior art motorized driving device had no provision to avoid stoppage of the action of the motor upon changing over from the rewinding mode to the winding mode, there was a possibility that the direction of transmission of driving torque by the transmission mechanism remained unchanged from the rewinding mechanism side to the winding-up mechanism side, thus producing the aforesaid problem.

SUMMARY OF THE INVENTION

With the foregoing in mind, it is an object of the present invention to provide a motorized driving device for a camera, which allows the direction of transmission of a transmission mechanism to be changed with high reliability in response to changing from a rewinding mode to a winding mode.

This and other objects of the invention will become apparent from the following detailed description of an embodiment thereof.

DETAILED DESCRIPTION OF THE PREFERRED EMBODIMENT

The present invention will next be described in greater detail in connection with an embodiment thereof.

Figure 1:
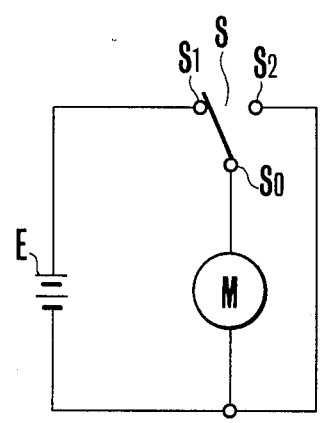
FIG. 1 is a diagram of a motor control circuit.

FIG. 1 illustrates a practical example of a motor circuit usuable in a motorized driving device for a camera, which performs winding up and rewinding of film by an electric motor, including an electrical power source or battery E, an electric motor M and a motor control switch S. The motor control switch S has contacts S0 to S2 operating in such a manner that when the camera is not wound up yet, the contacts S0 and S1 are closed, and when in wound-up position, the contacts S0 and S2 are closed to produce a braking action on the motor M.

Figure 2:
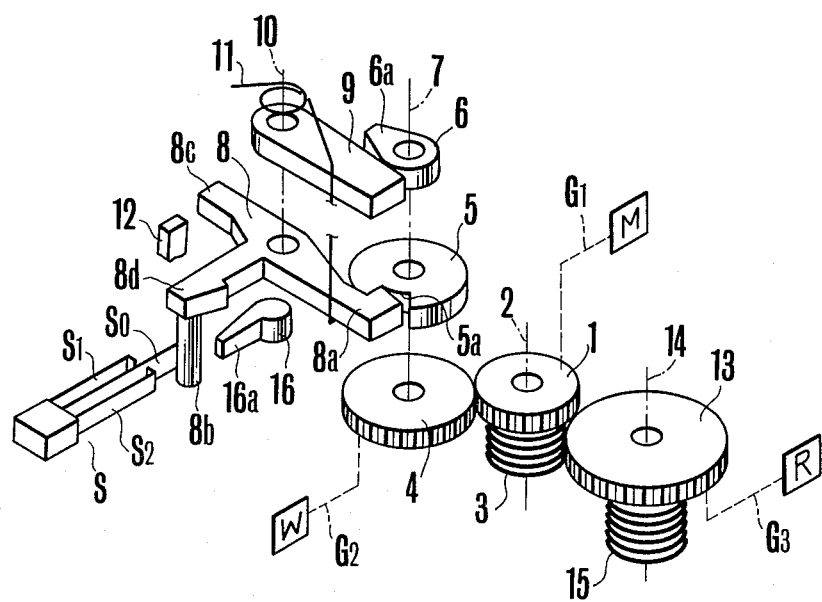
FIG. 2 is an exploded perspective view of an embodiment of a motorized driving device for a camera according to the present invention in a wound-up position.
Figure 3:
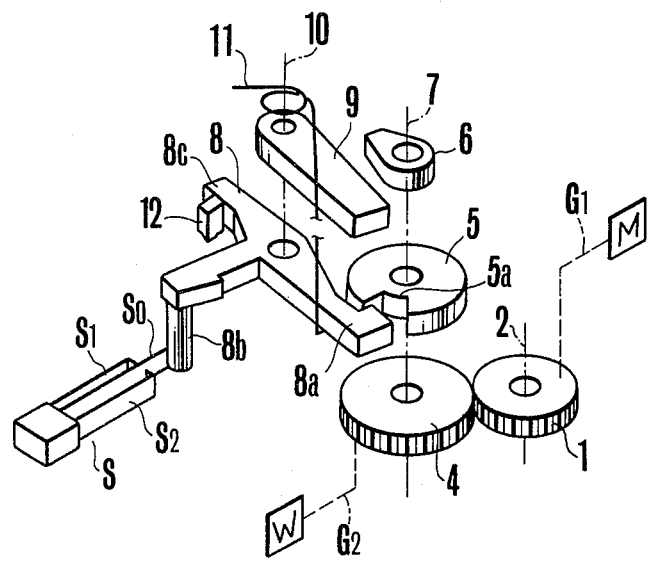
FIG. 3 is similar to FIG. 2 except that a shutter-run-down position of the invention is shown.
Figure 4:
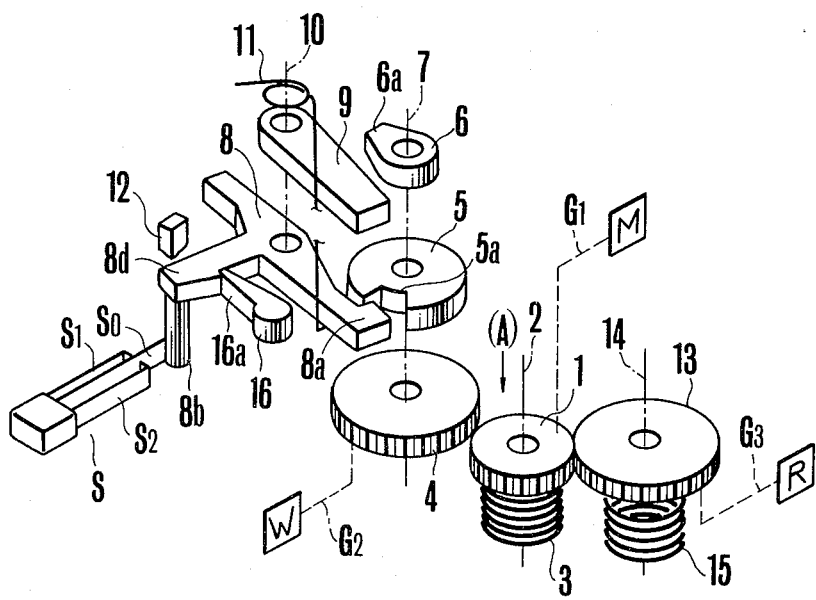
FIG. 4 is similar to FIG. 2 except that a rewinding position of the invention is shown.

FIGS. 2 to 4 illustrate the motorized driving device of the invention. FIG. 2 shows the motor M as illustrated in FIG. 1. Motion of the motor M is transmitted through a gear train G1 to a gear 1. The gear 1 is movable along a shaft 2 and arranged upon setting of the camera in the winding mode to mesh with a gear 4. The driving torque of the motor M is further transmitted from the gear 4 through a gear train G2 to a winding-up mechanism W for advancing a film and for charging a shutter. The gear 4 is provided with cams 5 and 6 as a unit therewith. (In the drawing, for the purpose of better understanding, these parts are shown exploded).

A lever 8 is combined with a lever 9 as a unit (though shown as exploded in the drawing), the end portion of the lever 9 functioning as a cam follower of the cam 6, and one end portion 8a of the lever 8 also functioning as a cam follower of the cam 5. Further, supported on another end of the lever 8 is a switch actuator pin 8b arranged to operate the movable contact S0 of the motor control switch S described in connection with FIG. 1. These levers 8 and 9 are urged by a spring 11 to turn about a shaft 10 in a counterclockwise direction. A running signal member 12 of a shutter (not shown) assumes the position of FIG. 2 when the shutter is in a charged position. When the shutter reaches the terminal end of running movement, as will be described more fully later, the signal member 12 strikes a third end 8c of the lever 8 and then turns the levers 8 and 9 in a clockwise direction against the bias force of the spring 11. A rewind lever 16 is freely rotatably supported on a framework (not shown), and urged by a spring (not shown) always in a counterclockwise direction, but held in the position of FIG. 2 when the camera is in the winding mode.

A gear 13 is connected through a gear train G3 to drive a rewinding mechanism R. But, when the camera is in the winding mode, the gear 13 is out of engagement with the drive gear 1. Further, the gear 13 is movable along a shaft 14 and assumes the illustrated position with the help of a buffer spring 15.

In operating the device of such construction, it is assumed to be first in the wound-up position of FIG. 2, where the pawl 8a of the lever 8 engages in a recess 5a of the cam disc 5, so that the contacts S0 and S2 of the motor control switch S are closed to unenergize the motor M as has been stated above. Then, after actuation of a camera release, when the shutter (not shown) is opened and closed, the running signal member 12 turns the levers 8 and 9 in the clockwise direction as has been stated above. That is, as illustrated in FIG. 3, the pawl 8a of the lever 8 is taken out of engagement with the recessed portion 5a of the cam disc 5, so that contact S0 of the motor control switch S is moved in engagement with the actuator pin 8b from the contact S2 to the contact S1. Therefore, the motor M is energized and, as has been stated above, motion of the motor M is transmitted through the gear train G1 and gear 1 to rotate the gear 4 and cams 5 and 6, and further through the gear train G2 to charge the winding up mechanism W. By this, the shutter (not shown) is also charged and the running signal member 12 too is moved from the position of FIG. 3 towards the position of FIG. 2 again. Such movement causes the lever 8 to abut with its pawl 8a on the outer periphery of the cam disc 5 under the action of the spring 11. After that, when the winding of the camera is completed, the pawl 8a of the lever 8 engages again in the recessed portion 5a of the cam disc 5. Thus, the mechanisms as a whole take the position of FIG. 2 and the motor M is stopped.

Next explanation is given to the film rewinding mode. When rewinding the exposed film, the operator needs first to release a driving torque transmission clutch (not shown) of the film transport system in automatic response to a rewind release actuation, so that the sprocket and takeup spool are rendered freely rotatable, and then to move the drive gear 1 in a direction indicated by arrow (A) in FIG. 4 against the force of the spring 3 so that the gear 1 is taken out of engagement with the gear 4 and brought into engagement with the gear 13. In case the gears 1 and 13 are not coincident in phase with each other at this time, the gear 13 is pushed by the gear 1 and moved in the same direction as the gear 1 while charging the buffer spring 15. Since motion of the motor M is transmitted to the gear 13, when a phase coincidence takes place, it comes into engagement with the gear 1 under the action of the spring 15 as illustrated in FIG. 4, thus moving the rewinding mechanism R. Further, at this time, the counterclockwise biased rewind lever 16 is caused to turn in the clockwise direction against its bias force until its free end 16a engages a lug 8d of the lever 8. It is in this engaging state that the pawl 8a of the lever 8 is released from locking connection with the cam disc 5 at the recess 5a, and the contacts S0 and S1 of the switch S are held in the closed position. It should be pointed out here that at a point in time that all the film except the leader has been rewound, the cam 5 can be considered to take one of two different positions relative to the lever 8. In the first position, the pawl 8a of the lever 8 contacts with the outer periphery of the cam disc 5. In the second position, the pawl 8a engages in the recessed portion 5a. Particularly in the second position, the current supply to the motor M is cut off. As has been stated above, according to the present invention, however, the rewind lever 16 is engaged with the lug 8d of the lever 8 so that even when in the second position, the current supply to the motor M is maintained.

When the camera is returned from the rewinding mode to the winding mode, the gear 1 is released from being urged in the direction indicated by arrow (A) so that the gear 1 is taken, by the force of the spring 3, out of engagement with the gear 13 and driven by the spring 3 towards engagement with the gear 4 again. On the other hand, the lever lug 8d and the end portion 16a remain engaged with each other although the camera has been reset in the winding mode, and, therefore, the contacts S0 and S1 of the switch S are in the conducting state so that the motor M continues rotating. Accordingly, the gear 1 continues rotating until its phase comes into synchronization with the phase of the gear 4, at which the gear 1 engages with the gear 4 again.

After this, the driving torque of the motor M is transmitted to the gear 4 so that the cams 5 and 6 are rotated with the end portion 6a of the cam lever 6 abutting against the cam follower 9 and turning the latter in the clockwise direction. Thus, the lever 8 together with the cam follower 9 is also turned in the clockwise direction to disengage the lug 8d from the end portion 16a. Then, the rewind lever 16 is returned to the position of FIG. 2 by the bias force of the spring (not shown). Since, at this time point, the recessed portion 5a of the cam 5 is not in alignment with the pawl 8a of the lever 8, motion of the motor M is allowed to continue until the subsequent rotation of the cam 5 brings its recessed portion 5a into alignment with the pawl 8a of the lever 8, and the contact S0 of the switch S is switched to the contact S2.

That is, the duration of energization of the motor M is terminated after the gear 1 and the gear 4 are recombined with each other, as the changing over operation from the rewinding to the winding mode has been performed.

As has been described in detail above, the present invention provides a motorized driving device for a camera with means to hold the current supply state to the motor for a certain period after changing from the rewinding mode to the winding mode. This gives the advantage that reversed transmission of the driving torque of the motor to either of the winding mechanism and the rewinding mechanism can be established without fail. Thus, the motorized driving device for a camera which is free from the above-mentioned faulty operations, can be realized in a simple form.

What I claim:

1. A motorized driving device for selectively driving a winding mechanism and a rewinding mechanism of a camera having selectable winding and rewinding modes of operation, including:
   (a) an electric motor:
   (b) switching means movable between a first position wherein current is supplied to said motor, and a second position wherein the current supply to said motor is stopped;

(c) transmitting means for operatively connecting said motor to said winding mechanism when the switching mode is selected, and for operatively connecting said motor to said rewinding mechanism when the rewinding mode is selected;

(d) holding means for holding said switching means in the first position in response to operation of the rewinding mechanism; and (e) release means for moving said switching means to the second position, said release means being arranged to cooperate with the winding mechanism to release said holding means from holding said switching means.

2. A device according to claim 1, further including:

(f) changeover means for moving said switching means to the first position for a predetermined time from completion of an exposure operation of the camera and for allowing said switching means to move to the second position after said predetermined time, said changeover means being arranged to cooperate with the winding mechanism of the camera.

3. A device according to claim 2, wherein said switching means is arranged to move to the second position when said holding means is released by said release means and said changeover means allows said switching means to move to the second position.

4. A device according to claim 3, wherein said release means is arranged to release said holding means at a time which differs from that when said switching means is moved to the second position by said changeover means.

5. A motorized driving device for selectively driving a winding mechanism and a rewinding mechanism of a camera having selectable winding and rewinding modes of operation, including:

(a) an electric motor;

(b) switching means movable between a first position wherein current is supplied to said motor, and a second position wherein the current supply to said motor is stopped;

(c) transmitting means for operatively connecting said motor to said winding mechanism when the winding mode is selected, and for operatively connecting said motor to said rewinding mechanism when the rewinding mode is selected; and (d) changeover means for moving said switching means to the first position in response to operation of the rewinding mechanism and for moving said switching means to the second position after a delay of at least a predetermined time after operation of the winding mechanism.

* * * * *